(12) United States Patent
Ho et al.

(10) Patent No.: US 11,378,493 B1
(45) Date of Patent: Jul. 5, 2022

(54) METHOD FOR MOTION TEST AND CONTROL HOST OF MOVABLE MACHINERY

(71) Applicant: Industrial Technology Research Institute, Hsinchu (TW)

(72) Inventors: Ming-Chun Ho, Taichung (TW);
Chin-Hui Chen, Taichung (TW);
Chao-Chuang Mai, Taichung (TW);
Hsin-Chang Chang, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 17/169,560

(22) Filed: Feb. 8, 2021

(30) Foreign Application Priority Data

Dec. 24, 2020 (TW) .................................. 109146080

(51) Int. Cl.
*G06F 11/30* (2006.01)
*G01M 99/00* (2011.01)

(52) U.S. Cl.
CPC .............................. *G01M 99/005* (2013.01)

(58) Field of Classification Search
CPC ................................................ G01M 99/005
See application file for complete search history.

(56) References Cited

U.S. PATENT DOCUMENTS

| | | | |
|---|---|---|---|
| 5,115,177 A | 5/1992 | Tanaka et al. | |
| 5,124,622 A | 6/1992 | Kawamura et al. | |
| 5,274,546 A | 12/1993 | Kinoshita | |
| 5,335,231 A | 8/1994 | Kato | |
| 10,462,485 B2 | 10/2019 | Mammou et al. | |
| 10,571,890 B2 | 2/2020 | Satou et al. | |
| 2005/0246682 A1 | 11/2005 | Hines | |
| 2018/0129188 A1 | 5/2018 | Jacobs, II | |

(Continued)

FOREIGN PATENT DOCUMENTS

| | | |
|---|---|---|
| CN | 102819239 | 12/2012 |
| CN | 105404159 | 3/2016 |
| CN | 105718350 | 6/2016 |

(Continued)

OTHER PUBLICATIONS

"Notice of allowance of Taiwan Counterpart Application", dated Sep. 1, 2021, p. 1-p. 5.

*Primary Examiner* — Phuong Huynh
(74) *Attorney, Agent, or Firm* — JCIPRNET

(57) ABSTRACT

A method for a motion test and a control host of a movable machinery are provided. The method includes: loading a first motion test program; generating, according to the first motion test program, a template file recording first coordinate information indicated by the first motion test program for the movable machinery to perform a physical motion; loading a second motion test program; reading the template file according to program information of the second motion test program and comparing second coordinate information indicated by the second motion test program for the movable machinery to perform the physical motion with the first coordinate information; and generating, according to a comparison result, a warning message reflecting that a control for the movable machinery by the second motion test program may be abnormal.

20 Claims, 8 Drawing Sheets

(56) References Cited

U.S. PATENT DOCUMENTS

2019/0219984 A1\* 7/2019 Mai .................. G05B 19/4061
2020/0130184 A1 4/2020 Suzuki

FOREIGN PATENT DOCUMENTS

| | | |
|---|---|---|
| CN | 208384411 | 1/2019 |
| CN | 109894902 | 6/2019 |
| CN | 110109420 | 8/2019 |
| CN | 110883499 | 3/2020 |
| CN | 112015540 | 12/2020 |
| EP | 0115543 | 12/1985 |
| EP | 3501729 | 6/2019 |
| JP | H06110539 | 4/1994 |
| JP | H06110540 | 4/1994 |
| JP | H06113033 | 4/1994 |
| JP | H0922291 1 | 8/1997 |
| JP | H11119815 | 4/1999 |
| JP | 2001236115 | 8/2001 |
| JP | 2016058881 | 4/2016 |
| TW | 200506565 | 2/2005 |
| TW | 200919125 | 5/2009 |
| TW | M496785 | 3/2015 |
| TW | 201516593 | 5/2015 |
| TW | 201616257 | 5/2016 |
| TW | I541623 | 7/2016 |
| TW | 201643015 | 12/2016 |
| TW | 201731628 | 9/2017 |
| TW | 201930001 | 8/2019 |
| WO | 2019002493 | 1/2019 |

\* cited by examiner

METHOD FOR MOTION TEST AND CONTROL HOST OF MOVABLE MACHINERY

CROSS-REFERENCE TO RELATED APPLICATION

This application claims the priority benefit of Taiwan application serial no. 109146080, filed on Dec. 24, 2020. The entirety of the above-mentioned patent application is hereby incorporated by reference herein and made a part of this specification.

BACKGROUND

Technical Field

The disclosure relates to a test technology of a movable machinery, and particularly relates to a method for a motion test and a control host of a movable machinery.

Description of Related Art

Mechanical processing tools such as drilling or threading need to undergo reliability testing, such as testing whether the processing tool moves to the end position specified by the test program, during the processes of developing the control modules thereof. Generally speaking, traditional test mechanisms all require manual validation. In particular, for processing tools that adopt mechanical coordinates and working coordinates for positioning at the same time, each movement test involves the cross-validation among the difference between the mechanical coordinates and the working coordinates, the tool compensation value, and the coordinate system compensation value. In addition, a test program may contain several or even dozens of single test stages, and different test programs may also affect each other. Therefore, during the process of developing the processing control modules, the developer often needs to spend considerable manpower and time to perform relevant validation operations.

SUMMARY

The disclosure provides a method for a motion test and a control host of a movable machinery, which may improve the efficiency of performing the motion test for the movable machinery.

An embodiment of the disclosure provides a method for a motion test of a movable machinery, which includes the following steps. A first motion test program is loaded. A template file is generated according to the first motion test program. The template file records first coordinate information indicated by the first motion test program for the movable machinery to perform a physical motion. A second motion test program is loaded. The template file is read according to program information of the second motion test program and second coordinate information indicated by the second motion test program for the movable machinery to perform the physical motion is compared with the first coordinate information. A warning message is generated according to a comparison result. The warning message reflects that a control for the movable machinery by the second motion test program may be abnormal.

An embodiment of the disclosure further provides a control host of a movable machinery, which includes a storage circuit, a control interface, and a processor. The storage circuit is configured to store a template file. The control interface is configured to be coupled to the movable machinery. The processor is coupled to the storage circuit and the control interface. The processor is configured to perform the following steps. A first motion test program is loaded. The template file is generated according to the first motion test program. The template file records first coordinate information indicated by the first motion test program for the movable machinery to perform a physical motion. A second motion test program is loaded. The template file is read from the storage circuit according to program information of the second motion test program and second coordinate information indicated by the second motion test program for the movable machinery to perform the physical motion is compared with the first coordinate information. A warning message is generated according to a comparison result. The warning message reflects that a control for the movable machinery by the second motion test program may be abnormal.

Based on the above, after loading the first motion test program, a template file may be generated according to the first motion test program. The template file may be configured to record the first coordinate information indicated by the first motion test program for the movable machinery to perform a specific physical motion. After that, the second motion test program may be loaded. According to the program information of the second motion test program, the template file may be read. Then, automated comparison may be performed on the second coordinate information indicated by the second motion test program for the movable machinery to perform the physical motion and the first coordinate information. According to the comparison result, the warning message may be generated to reflect possible abnormalities in the control for the movable machinery by the second motion test program. As a result, the efficiency of performing the automated motion test for the movable machinery may be improved.

Several exemplary embodiments accompanied with figures are described in detail below to further describe the disclosure in detail.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
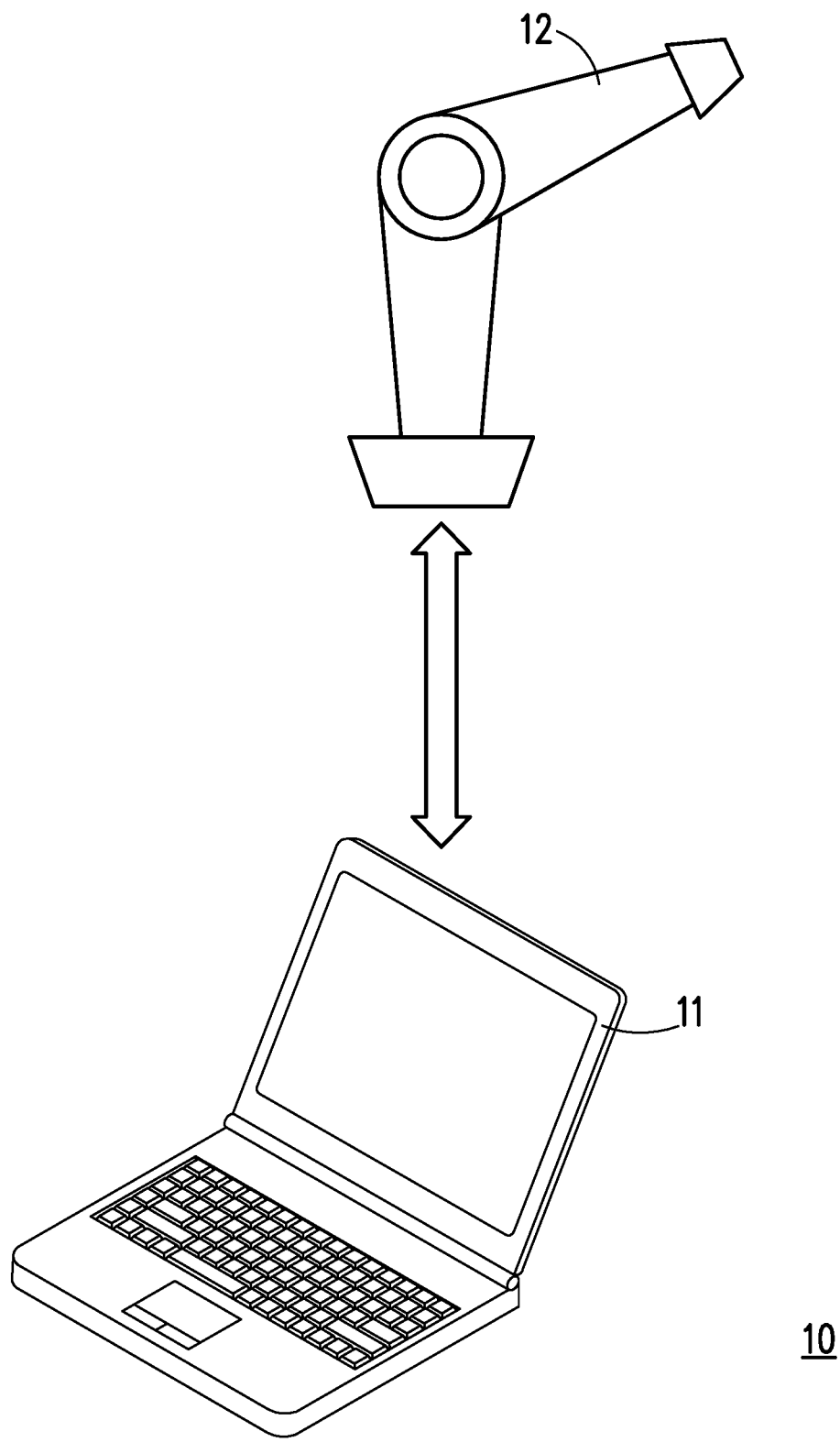
FIG. 1 is a schematic diagram of a system for a motion test of a movable machinery according to an embodiment of the disclosure.

FIG. 1 is a schematic diagram of a system for a motion test of a movable machinery according to an embodiment of the disclosure. Please refer to FIG. 1, a system (also referred to as a system for a motion test of a movable machinery) 10 includes a control host 11 and a movable machinery 12. The control host 11 may include various computer devices such as a notebook computer, a desktop computer, a smartphone, a tablet computer, an industrial computer, and/or a server.

The movable machinery 12 may include a robotic arm, a movable nozzle, a drilling tool, or other types of movable devices. The movable machinery 12 may be driven by driving tools such as various motors to execute physical motions such as a one-dimensional, two-dimensional, or three-dimensional movement and/or rotation. In an embodiment, the movable machinery 12 may include various types of processing tools to execute processing procedures such as steel tapping, face milling, face drilling, or threading. It should be noted that the number of movable machinery 12 may be one or more, which is not limited by the disclosure. In addition, the control host 11 may indicate or control the movable machinery 12 to execute a specific physical motion, such as moving to a specific location and/or executing the above processing procedures.

Figure 2:
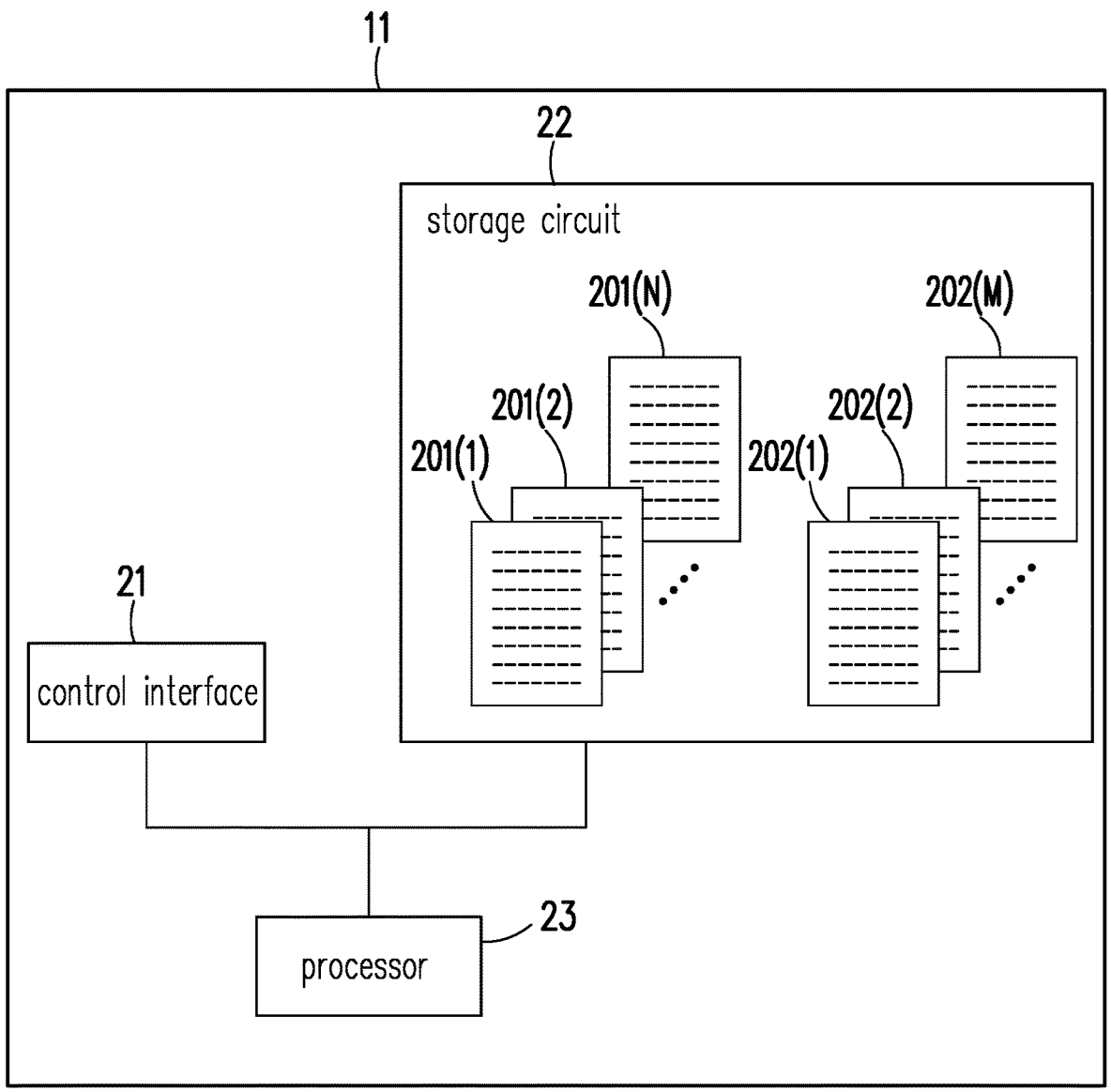
FIG. 2 is a functional block diagram of a control host according to an embodiment of the disclosure.

FIG. 2 is a functional block diagram of a control host according to an embodiment of the disclosure. Please refer to FIG. 2, the control host 11 includes a control interface 21, a storage circuit 22, and a processor 23. The control interface 21 is configured to be coupled to the movable machinery 12 and communicate with the movable machinery 12. For example, the control interface 21 is configured to transmit a control command to the movable machinery 12, so as to indicate the motor of the movable machinery 12 to drive the movable machinery 12 to move and/or rotate.

The storage circuit 22 includes a volatile storage circuit and a non-volatile storage circuit. The volatile storage circuit is configured to store data volatilely. For example, the volatile storage circuit may include a random access memory (RAM) or similar volatile storage media. The non-volatile storage circuit is configured to store data non-volatilely. For example, the non-volatile storage circuit may include a read only memory (ROM), a solid state disk (SSD), and/or a traditional hard disk drive (HDD), or similar non-volatile storage media.

The processor 23 is coupled to the control interface 21 and the storage circuit 22. The processor 23 is configured to be responsible for the overall or partial operation of the control host 11. For example, the processor 23 may include a central processing unit (CPU), other programmable general-purpose or special-purpose microprocessors, digital signal processors (DSP), programmable controllers, application specific integrated circuits (ASIC), programmable logic device (PLD), other similar devices, or a combination of these devices.

In an embodiment, the storage circuit 22 may be configured to store test programs (also referred to as motion test programs) 201(1) to 201(N), where N may be any positive integer. Each of the test programs 201(1) to 201(N) may be configured to perform a motion test on the movable machinery 12. Each of the test programs 201(1) to 201(N) may include one or more script programs. Each script program may be configured to automatically run the program codes in the corresponding test program. For example, when the processor 23 executes a test program (also referred to as a first motion test program) 201(i) among the test programs 201(1) to 201(N), the processor 23 may generate a control command according to the execution result of the test program 201(i). The control command may be transmitted to the movable machinery 12 via the control interface 21, so as to indicate the movable machinery 12 to execute the corresponding physical motion.

In an embodiment, the storage circuit 22 may be configured to store template files 202(1) to 202(M), where M may be any positive integer. Each of the template files 202(1) to 202(M) may correspond to one of the test programs 201(1) to 201(N). For example, a template file 202(i) may correspond to the test program 201(i). The template file 202(i) may be configured to record information relevant to the test program 201(i). In an embodiment, the test program 201(i) is a program file that may be executed by the processor 23, and the template file 202(i) may be a description file, a help file, or a text file for describing the test program 201(i).

In an embodiment, the processor 23 may load the test program 201(i) from the storage circuit 22. The processor 23 may analyze the test program 201(i) and generate the template file 202(i) according to the analysis result. The template file 202(i) may record coordinate information (also referred to as first coordinate information) indicated by the test program 201(i) for the movable machinery 12 to perform a certain physical motion.

In an embodiment, after loading the test program 201(i), the processor 23 may determine whether there is a template file corresponding to the test program 201(i) among the template files 202(1) to 202(M). In an embodiment, if there is no template file corresponding to the test program 201(i), the processor 23 may generate the template file 202(i) corresponding to the test program 201(i). Alternatively, in an embodiment, if there is the template file 202(i) corresponding to the test program 201(i), the processor 23 may not generate the template file 202(i) repeatedly.

In an embodiment, after loading the test program 201(i), the processor 23 may run the test program 201(i). The processor 23 may generate the control command according to the first coordinate information indicated by the test program 201(i). The control command may be configured to control the movable machinery 12 to execute the corresponding physical motion, such as rotating or moving to a coordinate position indicated by the first coordinate information.

In an embodiment, the template file 202(i) may record program information and the first coordinate information of the test program 201(i). The program information of the test program 201(i) may include a program name, a program version, and/or a program function description of the test program 201(i). The first coordinate information may include index information of one or more program blocks in the test program 201(i) and coordinate information of one or more program blocks in the test program 201(i). In addition, each program block may correspond to a physical motion and/or endpoint coordinates of the physical motion.

Figure 3:
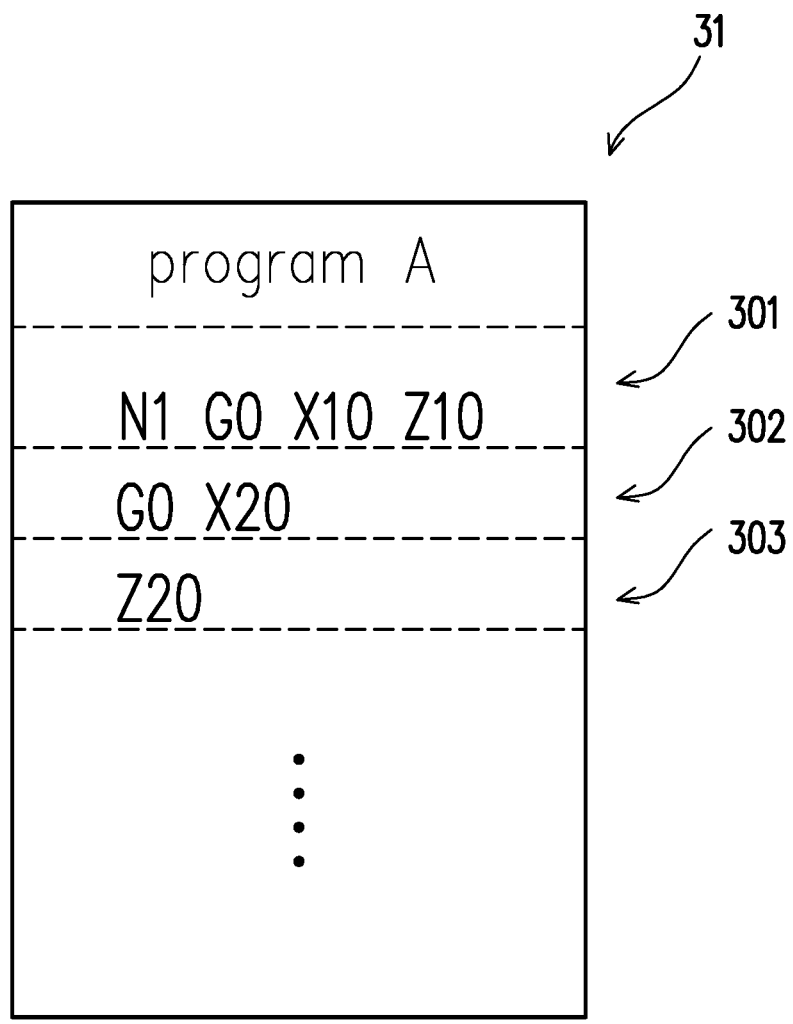
FIG. 3 is a schematic diagram of a motion test program according to an embodiment of the disclosure.

FIG. 3 is a schematic diagram of a motion test program according to an embodiment of the disclosure. Please refer to FIG. 3, a motion test program 31 is taken as an example of the first motion test program (such as the test program 201(i) in FIG. 2). The motion test program 31 contains a program A. Program codes of the program A contain program blocks 301 to 303. For example, the program block 301 may be configured to indicate the movable machinery 12 to move to a coordinate position (10, 10), the program block 302 may be configured to indicate the movable machinery 12 to move to a coordinate position (20, 10), and the program block 303 may be configured to indicate the movable machinery 12 to move to a coordinate position (20, 20).

It should be noted that the motion test program 31 of FIG. 3 is only an example, and is not intended to limit the disclosure. In another embodiment, the motion test program 31 may also record more information and/or record information in other ways, which is not limited by the disclosure. In addition, the embodiment of FIG. 3 is an example of the movable machinery 12 being indicated to move to specific X-axis and Z-axis positions, but the disclosure is not limited thereto. In other embodiments, a motion test program may also indicate the movable machinery 12 to move in other axial directions.

In an embodiment, coordinate information of a certain program block in the first motion test program may include first type coordinate information and second type coordinate information. The first type coordinate information may reflect ideal endpoint coordinates indicated by the program block for the movable machinery 12 to perform the physical motion. There may be a difference between the first type coordinate information and the second type coordinate information. The difference may be 0 or any value.

In an embodiment, the first type coordinate information is also referred to as working coordinates, and the second type coordinate information is also referred to as mechanical coordinates. Alternatively, in another embodiment, the first type coordinate information is also referred to as the mechanical coordinates, and the second type coordinate information is also referred to as the working coordinates.

Figure 4:
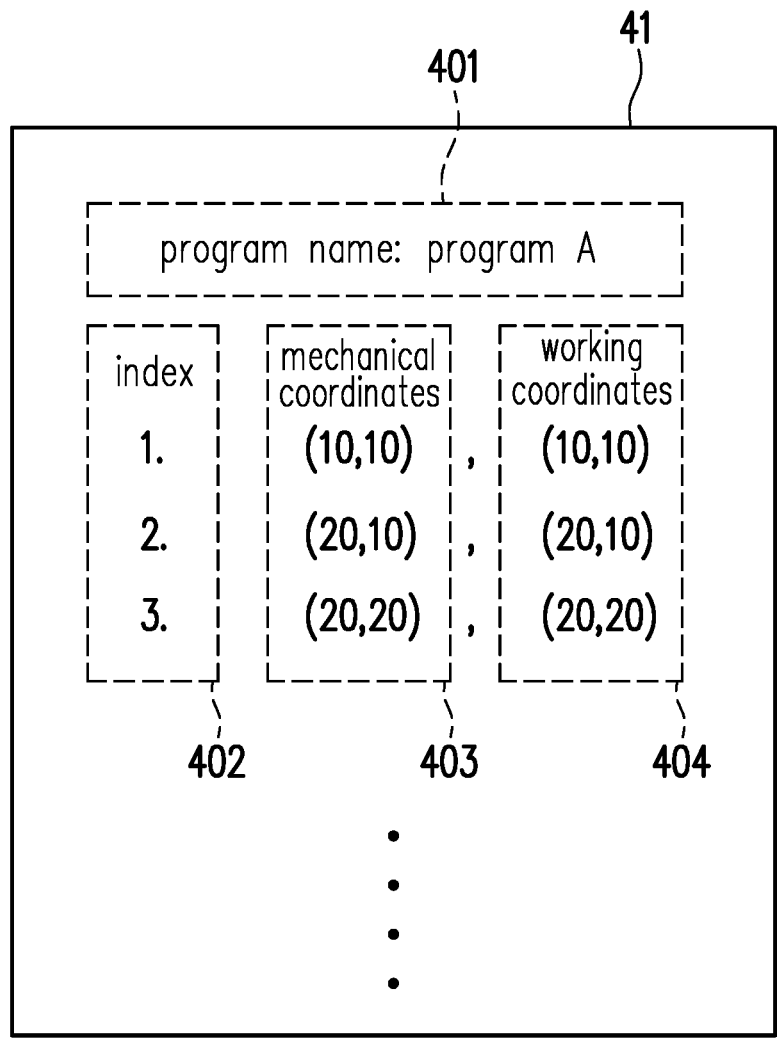
FIG. 4 is a schematic diagram of a template file according to an embodiment of the disclosure.

FIG. 4 is a schematic diagram of a template file according to an embodiment of the disclosure. Please refer to FIG. 4, following the embodiment of FIG. 3, a template file 41 may be generated according to the motion test program 31. The template file 41 may record a program name 401 (such as the program A), index information 402, mechanical coordinates 403, and working coordinates 404 of the motion test program 31. The index information 402 contains indices 1 to 3, and the indices 1 to 3 respectively correspond to the program blocks 301 to 303 in the motion test program 31.

The mechanical coordinates 403 contain the coordinates (10, 10), (20, 10), and (20, 20). The coordinates (10, 10) in the mechanical coordinates 403 correspond to the program block 301 and the index 1. The coordinates (20, 10) in the mechanical coordinates 403 correspond to the program block 302 and the index 2. The coordinates (20, 20) in the mechanical coordinates 403 correspond to the program block 303 and the index 3.

The working coordinates 404 contain the coordinates (10, 10), (20, 10) and (20, 20). The coordinates (10, 10) in the working coordinates 404 correspond to the program block 301 and the index 1. The coordinates (20, 10) in the working coordinates 404 correspond to the program block 302 and the index 2. The coordinates (20, 20) in the working coordinates 404 correspond to the program block 303 and the index 3.

It should be noted that in the embodiment of FIG. 4, it is assumed that the mechanical coordinates 403 are equal to the working coordinates 404. Therefore, coordinate information in the mechanical coordinates 403 may be exactly the same as coordinate information in the working coordinates 404. However, in another embodiment, if the movable machinery 12 undergoes positional offset (such as aging or wear) and/or a coordinate system change, the coordinate information in the mechanical coordinates 403 may not be exactly the same as the coordinate information in the working coordinates 404.

In an embodiment, the template file 202(i) may also record compensation information (also referred to as first compensation information) relevant to the physical motion performed by the movable machinery 12. The first compensation information may reflect the difference between the first type coordinate information and the second type coordinate information. For example, assuming that the first type coordinate information includes coordinates (A1, B1), and the second type coordinate information includes coordinates (A2, B2), then the first compensation information may reflect the difference between the coordinates (A1, B1) and the coordinates (A2, B2). For example, the first compensation information may include a coordinate difference (C1, C2), where C1=A1−A2 (or A2−A1), and C2=B1−B2 (or B2−B1).

In an embodiment, the first compensation information may include tool compensation information and coordinate system compensation information. The tool compensation information may be configured to compensate for the positional offset of the movable machinery 12 due to an alignment abnormality such as aging or wear. The coordinate system compensation information may compensate corresponding to the conversion between different coordinate systems. For example, if the tool compensation information includes a coordinate difference (X1, Y1), and the coordinate system compensation information includes a coordinate difference (X2, Y2), then in the coordinate difference (C1, C2), C1=X1+X2, and C2=Y1+Y2.

In an embodiment, working coordinates=(equals) mechanical coordinates−(minus) coordinate system offset value−(minus) tool shape compensation value−(minus) tool wear compensation value. The coordinate system offset value belongs to the coordinate system compensation information, and the tool shape compensation value and the tool wear compensation value belong to the tool compensation information. For example, assuming that the tool shape compensation value of the movable machinery 12 on the X-axis is 5, the tool wear compensation value of the movable machinery 12 on the X-axis is 0, and the coordinate system offset value of the movable machinery 12 on the X-axis contains an offset value of 2 and a reference value of 3, then the difference (such as C1) between the working coordinates and the mechanical coordinates of the movable machinery 12 on the X-axis may be 10 (that is, 10=5+0+2+3). In addition, assuming that the tool shape compensation value of the movable machinery 12 on the Z-axis is 5, the tool wear compensation value of the movable machinery 12 on the Z-axis is 0, and the coordinate system offset value of the movable machinery 12 on the Z-axis contains the offset value of 2 and the reference value of 13, then the difference (such as C2) between the working coordinates and the mechanical coordinates of the movable machinery 12 on the Z-axis may be 20 (that is, 20=5+0+2+13).

Figure 5:
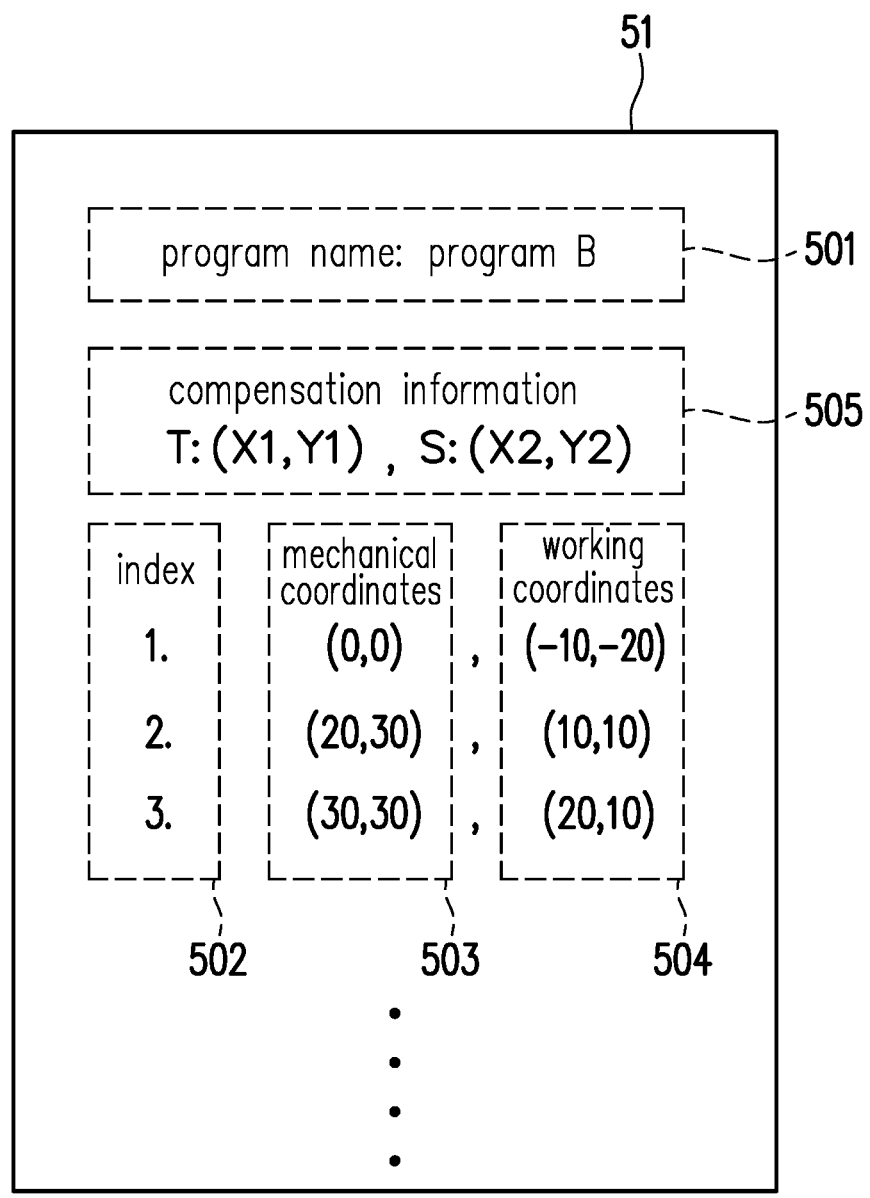
FIG. 5 is a schematic diagram of a template file according to an embodiment of the disclosure.

FIG. 5 is a schematic diagram of a template file according to an embodiment of the disclosure. Please refer to FIG. 5, a template file 51 may be generated according to the first motion test program. The template file 51 may record a program name 501 (such as a program B), index information 502, mechanical coordinates 503, and working coordinates 504 of the first motion test program. The indices 1 to 3 in the index information 502 respectively correspond to 3 program blocks in the first motion test program. The coordinates (0, 0) in the mechanical coordinates 503 and the coordinates (−10, −20) in the working coordinates 504 correspond to the index 1, the coordinates (20, 30) in the mechanical coordinates 503 and the coordinates (10, 10) in the working coordinates 504 correspond to the index 2, and the coordinates (30, 30) in the mechanical coordinates 503 and the coordinates (20, 10) in the working coordinates 504 correspond to the index 3.

In this embodiment, the template file 51 also records compensation information 505. The compensation information 505 includes tool compensation information (that is, T: (X1, Y1)) and coordinate system compensation information (that is, S: (X2, Y2)). In an embodiment, the sum of X1 and X2 may be 10, and the sum of Y1 and Y2 may be 20. In this way, the compensation information 505 may reflect the difference between the mechanical coordinates 503 and the working coordinates 504.

It should be noted that the template files 41 and 51 of FIG. 4 and FIG. 5 are only examples, and are not intended to limit the disclosure. In another embodiment, the template files 41 and 51 may also record more information and/or record information in other ways, which is not limited by the disclosure.

In an embodiment, the processor 23 may load another test program (also referred to as a second motion test program) 201(j), where i may be the same as or different from j. For example, the program structure and/or function of the test program 201(j) may be the same or similar to the program structure and/or function of the test program 201(i). The processor 23 may analyze the test program 201(j) to obtain program information of the test program 201(j) and coordinate information (also referred to as second coordinate information) indicated by the test program 201(j) for the movable machinery 12 to perform the physical motion. According to the program information of the test program 201(j), the processor 23 may read the template file 202(i) from the storage circuit 22.

In an embodiment, the processor 23 may search the template files 202(1) to 202(M) according to the program name of the test program 201(j) whether there is a template file with the same program name. Assuming that the program name recorded in the template file 202(i) is the same as the program name of test program 201(j) (for example, both are the program A or the program B), the processor 23 may read the template file 202(i) from the storage circuit 22.

In an embodiment, if the processor 23 cannot read a template file with the same program name as the program name of the test program 201(j) from the storage circuit 22, the processor 23 may establish the template file 202(j) corresponding to the test program 201(j) in the storage circuit 22 according to the operation mentioned in the foregoing embodiment. The relevant operation detail will not be repeated here.

In an embodiment, after reading the template file 202(i) according to the test program 201(j), the processor 23 may compare the second coordinate information indicated by the test program 201(j) with the first coordinate information recorded in the template file 202(i). Under specific situations, the processor 23 may generate a warning message according to a comparison result. The warning message may reflect that there may be an abnormality in the control for the movable machinery 12 by the second motion test program. In addition, the warning message may be presented via a display, a speaker, or other types of input/output devices of the control host 11, which is not limited by the disclosure.

In an embodiment, the processor 23 may determine whether the second coordinate information is consistent with the first coordinate information according to the comparison result. It should be noted that the consistency mentioned here refers to that the coordinate information indicated by a certain program block in the test program 201(j) is exactly the same as the coordinate information of the same program block recorded in the template file 202(i).

In an embodiment, taking FIG. 2 and FIG. 3 as an example, if the test program 201(j) is also the program A, and the coordinate information (containing mechanical coordinates and working coordinates) indicated by the program blocks 301 to 303 in the test program 201(j) is not exactly the same as the mechanical coordinates 403 and the working coordinates 404 recorded in the template file 41 and corresponding to the indices 1 to 3. For example, the program block 301 in the test program 201(j) indicates the mechanical coordinates (5, 10) while the mechanical coordinates corresponding to the index 1 in the mechanical coordinates 403 are (10, 10). In this example, the processor 23 may determine that the second coordinate information is inconsistent with the first coordinate information. In response to the second coordinate information being inconsistent with the first coordinate information, the processor 23 may generate a warning message. The warning message may reflect that there may be an abnormality in the control for the movable machinery 12 by the second motion test program (that is, the test program 201(j)).

In other words, in an embodiment, the program name of the test program 201(j) is the same as the program name recorded in the template file 41, which means that the test information (containing the second coordinate information) used by the test program 201(j) should theoretically be consistent with the test information (containing the first coordinate information) recorded in the template file 41. If the two are inconsistent, it means that there is a high probability that there is abnormal information (such as the developer having accidentally modified the second coordinate information) in the currently loaded test program 201 (j). Under this situation, if the test program 201(j) is continuously used to control the movable machinery 12 for the motion test, the movable machinery 12 may execute a wrong motion, the entire test environment may be affected, and/or the machinery may be damaged.

In an embodiment, in response to the second coordinate information being inconsistent with the first coordinate information and/or the warning message being generated, the processor 23 may stop the action of the movable machinery 12 (that is, stop or suspend the movable machinery 12 from executing the motion test). In this way, the probability of occurrence of the wrong event may be reduced. In addition, after the developer or the tester corrects the error in the test program 201(j), the processor 23 may reload the test program 201(j) and execute the comparison operation again.

In an embodiment, taking FIG. 2 and FIG. 3 as an example, if the test program 201(j) is also the program A, and the coordinate information (containing mechanical coordinates and working coordinates) indicated by the program blocks 301 to 303 in the test program 201(j) is exactly the same as the mechanical coordinates 403 and the working coordinates 404 recorded in the template file 41 and corresponding to the indices 1 to 3. In this example, the processor 23 may determine that the second coordinate information is consistent with the first coordinate information. In response to the second coordinate information being consistent with the first coordinate information, the processor 23 may not generate the warning message and may continue to execute a subsequent test program.

In an embodiment, in response to the second coordinate information being inconsistent with the first coordinate information, the processor 23 may obtain difference information (also referred to as first difference information) between the second coordinate information and the first coordinate information. In addition, in response to the second coordinate information being inconsistent with the first coordinate information, the processor 23 may also obtain difference information (also referred to as second difference information) between compensation information (also referred to as second compensation information) indicated by the test program 201(*j*) and the first compensation information in the template file 202(*i*). The processor 23 may determine whether the first difference information is consistent with the second difference information. It should be noted that the consistency mentioned here refers to that the coordinate difference indicated by the first difference information is exactly the same as the coordinate difference indicated by the second difference information.

Taking FIG. 5 as an example, assuming that the test program 201(*j*) is the program B, the mechanical coordinates indicated by the program block corresponding to the index 2 in the template file 51 in the test program 201(*j*) are (10, 20), and the mechanical coordinates corresponding to the index 2 in the mechanical coordinates 503 are (20, 30). In this example, processor 23 may obtain the first difference information including a coordinate difference (10, 10) (that is, 20−10=10, and 30−20=10). In addition, the processor 23 may obtain that the sum of tool compensation information (X3, Y3) and coordinate system compensation information (X4, Y4) in the compensation information (that is, the second compensation information) indicated by the test program 201(*j*) is (0, 10) (that is, X3+X4=0, and Y3+Y4=10). The sum is also referred to as a compensation coordinate difference corresponding to the second compensation information.

Then, the processor 23 may obtain the second difference information between the compensation coordinate difference (0, 10) corresponding to the second compensation information and the compensation coordinate difference (10, 20) (that is, X1+X2=10, and Y1+Y2=20) corresponding to the compensation information 505 (that is, the first compensation information) in the template file 51. For example, the second difference information includes the coordinate difference (10, 10) (that is, 10−0=10, and 20−10=10). The processor 23 may determine whether the first difference information is consistent with the second difference information. In this example, the coordinate difference (10, 10) in the first difference information is equal to the coordinate difference (10, 10) in the second difference information. Therefore, the processor 23 may determine that the first difference information is consistent with the second difference information. In response to the first difference information being consistent with the second difference information, the processor 23 may not generate the warning message. However, in another embodiment, if the first difference information and the second difference information compared by the above manner are inconsistent, the processor 23 may generate the warning message in response to the first difference information being inconsistent with the second difference information.

In other words, in an embodiment, if the second coordinate information is different from the first coordinate information due to changes in the compensation information (that is, the second compensation information adopted by the second motion test program is different from the first compensation information recorded in the template file read by the second motion test program), then the second motion test program may still be regarded as a normal (or good) test program, and the motion test of the movable machinery 12 is continued according to the second motion test program.

In an embodiment, after determining that the second coordinate information is inconsistent with the first coordinate information but the first difference information is consistent with the second difference information, the processor 23 may update the first compensation information in the read template file 202(*i*) according to the second compensation information indicated by the test program 201(*j*). For example, the processor 23 may use the second compensation information of the test program 201(*j*) to replace the first compensation information in the template file 202(*i*). The updated template file 202(*i*) may be restored to the storage circuit 22.

In an embodiment, after obtaining the first difference information, the processor 23 may also determine whether the first difference information belongs to an allowable error. If the first difference information is an allowable error (for example, the difference in the first difference information falls within an allowable error range), it means that the first difference information is insignificant. Therefore, the processor 23 may not generate the warning message. Conversely, if the first difference information does not belong to an allowable error (for example, the difference in the first difference information does not fall within the allowable error range), it means that the first difference information is significant. Therefore, the processor 23 may generate the warning message or further execute the operation of comparing the first difference information with the second difference information.

It should be noted that in the foregoing embodiments, the processor 23 controlling the movable machinery 12 to execute the corresponding physical motion in real time according to the test program is taken as an example for description. However, in another embodiment, the processor 23 may also execute the test program in a simulated manner. In other words, after loading a certain test program, the processor 23 may validate/verify the test program according to the operation mentioned in the foregoing embodiment. However, the processor 23 may not send a control command to the movable machinery 12 according to an execution result of the test program. If the test program passes the validation/verification, the processor 23 may continue to validate the next test program. Conversely, if the test program fails the validation, the processor 23 may also generate the warning message.

Figure 6:
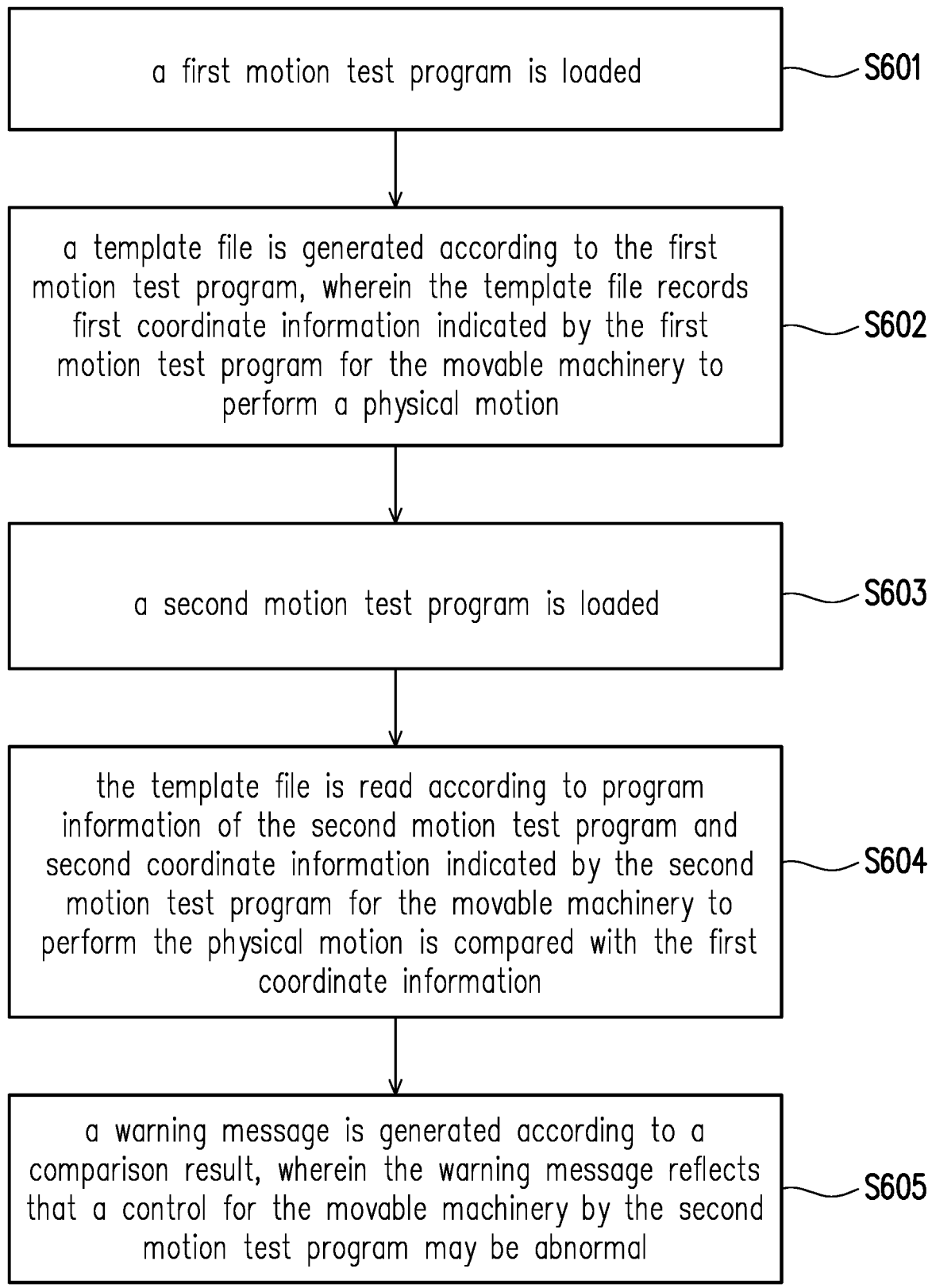
FIG. 6 is a flowchart of a method for a motion test of a movable machinery according to an embodiment of the disclosure.

FIG. 6 is a flowchart of a method for a motion test of a movable machinery according to an embodiment of the disclosure. Please refer to FIG. 6. In Step S601, a first motion test program is loaded. In Step S602, a template file is generated according to the first motion test program. The template file records first coordinate information indicated by the first motion test program for the movable machinery to perform a physical motion. In Step S603, a second motion test program is loaded. In Step S604, the template file is read according to program information of the second motion test program and the second coordinate information indicated by the second motion test program for the movable machinery to perform the physical motion is compared with the first coordinate information. In Step S605, a warning message is generated according to a comparison result. The warning message reflects that a control for the movable machinery by the second motion test program may be abnormal.

Figure 7:
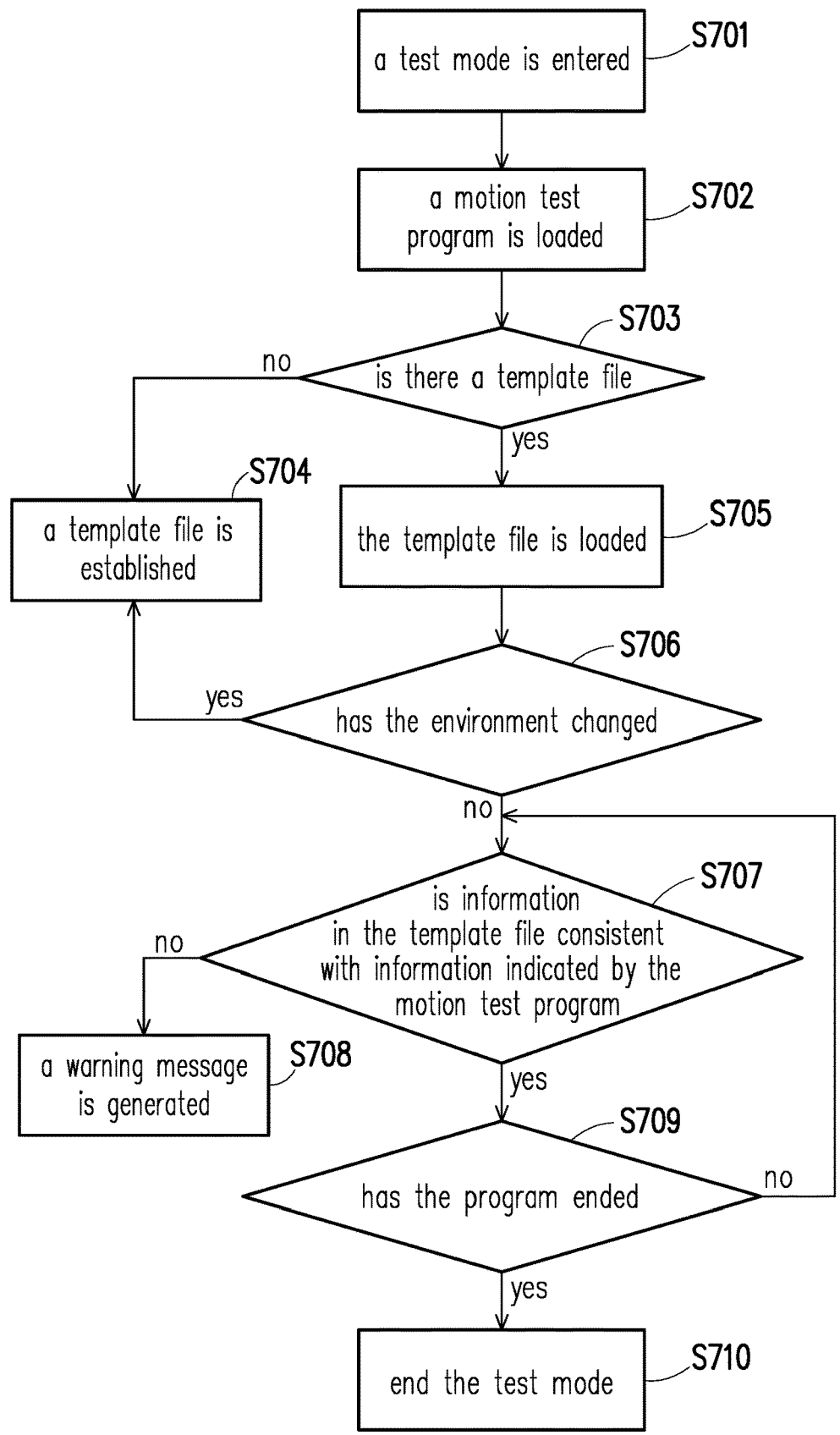
FIG. 7 is a flowchart of a method for a motion test of a movable machinery according to an embodiment of the disclosure.

FIG. 7 is a flowchart of a method for a motion test of a movable machinery according to an embodiment of the disclosure. Please refer to FIG. 7. In Step S701, a test mode of the movable machinery is entered. In Step S702, a motion test program is loaded. In Step S703, whether there is a template file corresponding to the motion test program is determined. For example, the corresponding template file may be searched in a storage circuit or a database according to the program information of the currently loaded motion test program. If there is no template file corresponding to the motion test program, in Step S704, a template file corresponding to the motion test program is established in the storage circuit or the database. However, if there is the template file corresponding to the motion test program, then in Step S705, the template file is loaded.

In Step S706, whether the environment has changed is determined. For example, whether environmental parameters (such as tool compensation information and/or coordinate system compensation information) currently used by the system are the same as environmental parameters used in the template file may be determined. If the environment has changed, a corresponding template file may be established according to the new environment parameters in Step S704. If the environment has not changed, Step S707 may be proceeded.

In Step S707, whether information (such as first coordinate information) in the template file is consistent with information (such as second coordinate information) indicated by the motion test program is determined. If the information (such as the first coordinate information) in the template file is inconsistent with the information (such as the second coordinate information) indicated by the motion test program, in Step S708, a warning message is generated. If the information (such as the first coordinate information) in the template file is consistent with the information (such as the second coordinate information) indicated by the motion test program, in Step S709, whether the current motion test program has been completely executed is determined. If not, return to Step S707 to continue executing the program and execute the above validation/verification. Alternatively, if the program has been completely executed, in Step S710, end and leave the test mode.

Figure 8:
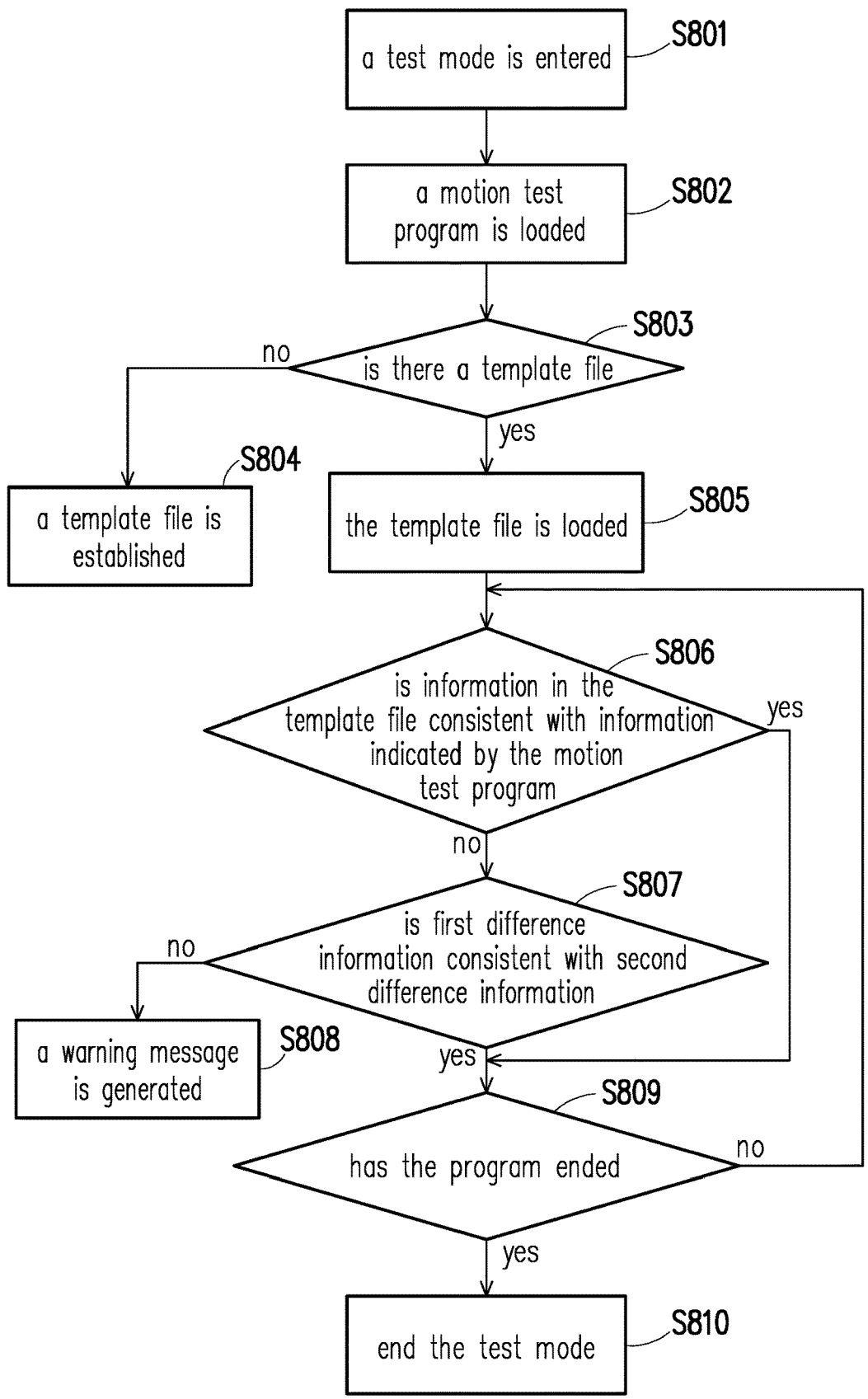
FIG. 8 is a flowchart of a method for a motion test of a movable machinery according to an embodiment of the disclosure.

FIG. 8 is a flowchart of a method for a motion test of a movable machinery according to an embodiment of the disclosure. Please refer to FIG. 8. In Step S801, a test mode of the movable machinery is entered. In Step S802, a motion test program is loaded. In Step S803, whether there is a template file corresponding to the motion test program is determined. For example, the corresponding template file may be searched in a storage circuit or a database according to program information of the currently loaded motion test program. If there is no template file corresponding to the motion test program, in Step S804, a template file corresponding to the motion test program is established in the storage circuit or the database. However, if there is the template file corresponding to the motion test program, then in Step S805, the template file is loaded and Step S806 is proceeded.

In Step S806, whether information (such as first coordinate information) in the template file is consistent with information (such as second coordinate information) indicated by the motion test program is determined. If the information (such as the first coordinate information) in the template file is inconsistent with the information (such as the second coordinate information) indicated by the motion test program, in Step S807, whether first difference information is consistent with second difference information is determined. It should be noted that the first difference information reflects the difference between the first coordinate information in the currently read template file and the second coordinate information indicated by the currently loaded motion test program, and the second difference information reflects the difference between first compensation information in the currently read template file and second compensation information indicated by the currently loaded motion test program.

If the first difference information is inconsistent with the second difference information, in Step S808, a warning message is generated. If the first difference information is consistent with the second difference information, in Step S809, whether the current motion test program has been completely executed is determined. If not, return to Step S806 to continue executing the program and execute the above validation/verification. Alternatively, if the program has been completely executed, in Step S810, end and leave the test mode.

However, each step in FIG. 6 to FIG. 8 has been described in detail as above, and will not be repeated here. It is worth noting that each step in FIG. 6 to FIG. 8 may be implemented as multiple program codes (such as software modules) or circuits (such as circuit modules), which is not limited by the disclosure. In addition, the methods of FIG. 6 to FIG. 8 may be used in conjunction with the above exemplary embodiments or may be used alone, which is not limited by the disclosure.

In summary, after loading a certain motion test program, if there is no template file corresponding to the motion test program, then the template file corresponding to the motion test program may be established. If there is the template file corresponding to the motion test program, the template file corresponding to the motion test program may be read and configured to validate/verify the motion test program. The validation/verification may include automatically comparing whether the coordinate information in the motion test program and the corresponding template file are consistent. Under certain situations (for example, when the coordinate information in the motion test program and the corresponding template file are inconsistent), the compensation information in the motion test program and the corresponding template file may be further used to cross-validate the coordinate information, thereby improving the validation accuracy and/or reducing the false positive rate. When the system automatically detects that the current test program is abnormal, a warning message may be generated, and the current test motion may be suspended, so as to prevent adverse effects from continuously expanding. As a result, the efficiency of performing the automated motion test for the movable machinery may be improved.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for a motion test of a movable machinery, comprising:
    loading, by a processor of a control host, a first motion test program;
    generating, by the processor, a template file according to the first motion test program, wherein the template file records first coordinate information indicated by the first motion test program for the movable machinery to perform a physical motion;
    loading, by the processor, a second motion test program;
    reading, by the processor, the template file according to program information of the second motion test program and comparing, by the processor second coordinate information indicated by the second motion test program for the movable machinery to perform the physical motion with the first coordinate information; and generating, by the processor, a warning message according to a comparison result, wherein the warning message reflects that a control for the movable machinery by the second motion test program may be abnormal.

2. The method for the motion test of the movable machinery according to claim 1, wherein the first coordinate information comprises index information of a program block in the first motion test program and coordinate information corresponding to the program block.

3. The method for the motion test of the movable machinery according to claim 2, wherein the coordinate information corresponding to the program block comprises first type coordinate information and second type coordinate information, the first type coordinate information reflects ideal endpoint coordinates for the movable machinery to perform the physical motion, and there is a difference between the first type coordinate information and the second type coordinate information.

4. The method for the motion test of the movable machinery according to claim 3, wherein the template file further records first compensation information relevant to the physical motion performed by the movable machinery, and the first compensation information reflects the difference.

5. The method for the motion test of the movable machinery according to claim 1, wherein generating the warning message according to the comparison result comprises:
generating the warning message in response to the second coordinate information being inconsistent with the first coordinate information.

6. The method for the motion test of the movable machinery according to claim 1, wherein generating the warning message according to the comparison result comprises:
obtaining first difference information between the second coordinate information and the first coordinate information, and second difference information between second compensation information indicated by the second motion test program and first compensation information in the template file in response to the second coordinate information being inconsistent with the first coordinate information;
generating the warning message in response to the first difference information being inconsistent with the second difference information; and
not generating the warning message in response to the first difference information being consistent with the second difference information.

7. The method for the motion test of the movable machinery according to claim 6, further comprising:
updating the first compensation information according to the second compensation information in response to the first difference information being consistent with the second difference information.

8. The method for the motion test of the movable machinery according to claim 1, wherein generating the warning message according to the comparison result comprises:
obtaining first difference information between the second coordinate information and the first coordinate information in response to the second coordinate information being inconsistent with the first coordinate information;
generating the warning message in response to the first difference information not belonging to an allowable error; and
not generating the warning message in response to the first difference information belonging to the allowable error.

9. The method for the motion test of the movable machinery according to claim 1, further comprising:
generating a control command according to the first coordinate information after loading the first motion test program; and
controlling the movable machinery to execute the physical motion according to the control command.

10. The method for the motion test of the movable machinery according to claim 1, further comprising:
stopping an action of the movable machinery in response to the warning message being generated.

11. A control host of a movable machinery, comprising:
a storage circuit, configured to store a template file;
a control interface, configured to be coupled to the movable machinery; and
a processor, coupled to the storage circuit and the control interface, wherein
the processor is configured to:
load a first motion test program;
generate the template file according to the first motion test program, wherein the template file records first coordinate information indicated by the first motion test program for the movable machinery to perform a physical motion;
load a second motion test program;
read the template file from the storage circuit according to program information of the second motion test program and compare second coordinate information indicated by the second motion test program for the movable machinery to perform the physical motion with the first coordinate information; and
generate a warning message according to a comparison result, wherein the warning message reflects that a control for the movable machinery by the second motion test program may be abnormal.

12. The control host of the movable machinery according to claim 11, wherein the first coordinate information comprises index information of a program block in the first motion test program and coordinate information corresponding to the program block.

13. The control host of the movable machinery according to claim 12, wherein the coordinate information corresponding to the program block comprises first type coordinate information and second type coordinate information, the first type coordinate information reflects ideal endpoint coordinates for the movable machinery to perform the physical motion, and there is a difference between the first type coordinate information and the second type coordinate information.

14. The control host of the movable machinery according to claim 13, wherein the template file further records first compensation information relevant to the physical motion performed by the movable machinery, and the first compensation information reflects the difference.

15. The control host of the movable machinery according to claim 11, wherein generating the warning message according to the comparison result comprises:
generating the warning message in response to the second coordinate information being inconsistent with the first coordinate information.

16. The control host of the movable machinery according to claim 11, wherein generating the warning message according to the comparison result comprises:

obtaining first difference information between the second coordinate information and the first coordinate information, and second difference information between second compensation information indicated by the second motion test program and first compensation information in the template file in response to the second coordinate information being inconsistent with the first coordinate information;

generating the warning message in response to the first difference information being inconsistent with the second difference information; and not generating the warning message in response to the first difference information being consistent with the second difference information.

17. The control host of the movable machinery according to claim 16, wherein the processor is further configured to:
update the first compensation information according to the second compensation information in response to the first difference information being consistent with the second difference information.

18. The control host of the movable machinery according to claim 11, wherein generating the warning message according to the comparison result comprises:

obtaining first difference information between the second coordinate information and the first coordinate information in response to the second coordinate information being inconsistent with the first coordinate information;

generating the warning message in response to the first difference information not belonging to an allowable error; and not generating the warning message in response to the first difference information belonging to the allowable error.

19. The control host of the movable machinery according to claim 11, wherein the processor is further configured to:
generate a control command according to the first coordinate information after loading the first motion test program; and
control the movable machinery to execute the physical motion according to the control command.

20. The control host of the movable machinery according to claim 11, wherein the processor is further configured to stop an action of the movable machinery in response to the warning message being generated.

\* \* \* \* \*